United States Patent [19]

Kämper

[11] Patent Number: 5,205,020

[45] Date of Patent: * Apr. 27, 1993

[54] TENSIONING APPARATUS FOR A LASHING STRAP

[75] Inventor: Hans-Werner Kämper, Würselen, Fed. Rep. of Germany

[73] Assignee: Spanset Inter AG, Oetwil am See, Switzerland

[*] Notice: The portion of the term of this patent subsequent to Apr. 14, 2009 has been disclaimed.

[21] Appl. No.: 845,664

[22] Filed: Mar. 4, 1992

Related U.S. Application Data

[63] Continuation-in-part of Ser. No. 694,839, May 2, 1991, Pat. No. 5,103,536.

[30] Foreign Application Priority Data

Mar. 8, 1991 [DE] Fed. Rep. of Germany ... 9102777[U]

[51] Int. Cl.$^5$ .............................................. B25B 25/00
[52] U.S. Cl. ................... 24/68 CD; 24/68 R
[58] Field of Search ............... 24/68 CD, 68 R, 71.2, 24/19; 294/74, 75; 254/218

[56] References Cited

U.S. PATENT DOCUMENTS

| | | | |
|---|---|---|---|
| 3,180,623 | 4/1965 | Huber | 24/68 CD |
| 4,199,182 | 4/1980 | Sunesson | 24/68 CD |
| 4,227,286 | 10/1980 | Holmberg . | |
| 4,542,883 | 9/1985 | Rutzki | 24/68 CD |
| 4,570,305 | 2/1986 | Smetz et al. | 24/68 CD |
| 4,584,742 | 4/1986 | Speich | 24/68 R |
| 4,622,721 | 11/1986 | Smetz et al. | 24/68 CD |

FOREIGN PATENT DOCUMENTS

| | | |
|---|---|---|
| 8536678 | 12/1985 | Fed. Rep. of Germany . |
| 0579154 | 12/1956 | Italy ............................... 24/68 CD |
| 1342218 | 1/1974 | United Kingdom ............ 24/68 CD |
| 2105805 | 3/1983 | United Kingdom . |
| 2108616 | 5/1983 | United Kingdom . |

OTHER PUBLICATIONS

Richter-von Voss, "Bauelemente der Feinmechanik" [Precision Mechanism Components], 9th Ed. (1964), p. 262.

Lueger, "Lexikon der Technik [Encyclopedia of Technology]", vol. 1 (1960), pp. 530–531.

*Primary Examiner*—Victor N. Sakran
*Attorney, Agent, or Firm*—Spencer, Frank & Schneider

[57] ABSTRACT

A tensioning apparatus for the step-wise tensioning and non-stepped releasing of a lashing strap includes a frame (1; 100), a pivot lever (2) having two pivot arms (16, 16'), and a ratchet mechanism that includes ratchet wheels (3, 3') and locking pawls (5, 5'; 105, 105'). By using a plurality of locking pawls (5, 5'; 105, 105'), the tensioning apparatus is able to absorb a greater lashing force or to tension the lashing strap in locking steps which differ from the tooth pitch t. To release the lashing strap, cams (40) on the pivot arms (16, 16') of the pivot lever (2) move the locking pawls and thus the ratchet mechanism to a disengaged position. The structural height of the tensioning apparatus and the number of components required for it may be reduced by using curved locking pawls (5, 5'; 105, 105'), a curved driving pawl (20), and a leg spring (41) which serves as the sole spring element for biasing the locking pawls.

17 Claims, 5 Drawing Sheets

TENSIONING APPARATUS FOR A LASHING STRAP

CROSS REFERENCE TO RELATED APPLICATIONS

This is a continuation-in-part of application Ser. No. 07/694,839, filed May 2nd, 1991 now U.S. Pat. No. 5,103,536 the disclosure of which is incorporated herein by reference. Furthermore this application claims the priority of application Ser. No. G 91 02 777.2, filed Mar. 18th, 1991 in Germany, the disclosure of which is also incorporated herein by reference.

BACKGROUND OF THE INVENTION

The present invention relates to an apparatus for tensioning and securing a lashing strap, and more particularly to a tensioning apparatus of the type that includes a basic frame to which one end of the lashing strip is attached, a wind-up spindle that is rotatably mounted on the frame and that receives the other end of the lashing strap, and a ratchet mechanism to secure the spindle from reverse rotation with respect to the frame, the ratchet mechanism including a ratchet wheel and at least two locking pawls which can be displaced under pressure toward the ratchet wheel and which can be brought into engagement with the ratchet wheel. In such a tensioning apparatus, which may also be called a tensioning ratchet, the lashing tension is created in the lashing strap as a result of the strap being shortened due to being wound up.

To prevent rotation in the reverse direction during the tensioning process, the wind-up spindle can be blocked in the direction opposite to its tensioning direction by means of the ratchet mechanism. This ratchet mechanism also locks the wind-up spindle in its end position when the lashing strap is completely tensioned or lashed.

Such ratchet mechanisms are disclosed, for example, in Richter and Von Vos, Bauelemente der Feinmechanik [Precision Mechanism Components], 9th Edition, 1964, page 262. According to this publication, a ratchet mechanism is composed of a locking member and a lockable member. It is also known to reduce the ratchet movement steps by providing several locking means or detent latches (see Lueger, Lexikon der Technik [Encyclopedia of Technology], Volume 1, 1960, page 530).

The ratchet mechanisms mentioned in Richter and Von Voss (supra), in particular, make it possible to introduce the tensioning force into the strap in steps by rotating the wind-up spindle in the tensioning direction, while simultaneously ensuring that the wind-up spindle will be unable to turn in the reverse direction. In ratchet mechanisms of this type, it is customary to configure the locking members not as detent latches but as locking pawls. The detent latches are mounted so as to be pivotal and are biased by a spring element. In order to transfer great forces, the detent latches and the spring elements must be made very large. In contrast thereto, when locking pawls are used as the locking elements they permit, in principle, a space saving configuration. Moreover, high forces can be transmitted by way of such locking pawls.

When in the engaged position, the locking pawls engage in teeth carried on the ratchet wheel. These teeth are oriented in such a way that, in order to lock, the locking pawls grip behind the steep leading edges of the ratchet teeth, while rotation of the wheel causes the locking pawls to slide over the rounded rear tooth edges.

With every locking step, the locking pawls move in order to pass over a ratchet tooth. For this reason, the locking pawls are mounted on the basic frame of the apparatus, preferably at the side walls of the frame, so as to perform a linear or translatory movement. Thus the frame side walls must be designed in such a way that the path required for the translatory movement is available. At the end of the locking step and after passing over the ratchet tooth, the locking pawls undergo another translatory movement radially back into the teeth.

To be able to lock at smaller steps that differ from the tooth pitch of the ratchet wheel, or in order to be able to absorb lashing forces that a locking pawl or detent latch on its own would be unable to absorb, the prior art provides for the arrangement of a plurality of locking pawls that are distributed radially around the circumference of the ratchet wheel. The structural height of the basic frame must be increased with the number of locking pawls distributed radially around the circumference of the ratchet wheel, since the structural height of the side wall of the frame must be great enough to accommodate the translatory movement of each locking pawl.

To reduce the structural height of such a tensioning apparatus employing two locking pawls, it is therefore desirable for the locking pawls to be oriented in the manner of the legs of an acute angle, or better still to be oriented as parallel as possible to one another. A tensioning apparatus having such a parallel arrangement of locking pawls is disclosed in German Patent 3,344,487, corresponding to U.S. Pat. No. 4,570,305. The drawback of this prior art apparatus is the fact that the locking element is divided into two parts in order to obtain the two parallel locking pawls. Two such parallel locking pawls are able to step only in small tooth pitches. If the tooth pitch is too large, the pawls would have to be designed unusually large and thus high.

Another drawback in the prior art apparatus is that the locking pawls are always in engagement with the same succession of ratchet teeth. A particularly good locking effect is attained with radially arranged locking pawls whenever the steep leading edge of the ratchet tooth behind which a locking pawl engages lies completely, and over its full area, against the side of the locking pawl, thus generating pressure at the area of engagement. If the locking pawl does not extend precisely radially to the ratchet wheel, the steep leading edge of the tooth lies against the end of the locking pawl, which causes the locking pawl to press against the steep tooth edge only at certain points. This point-like engagement may lead to the gradual flattening of the steep tooth edge and, in the worst case, to breakage of the tooth edge.

Moreover, with two parallel locking pawls, only a small tooth angle ca be achieved between the steep leading edge of a tooth and the rounded trailing edge if the above-described risk of a point-shaped load at the end of the locking pawl is to be avoided (see Richter and Von Voss, supra).

If a plurality of locking pawls is to be employed so as to absorb extremely high lashing forces, it is advantageous, in principle, to allow them to engage ratchet teeth at several locations distributed around the circumference of the ratchet wheel. In this way, the lashing force is distributed better to the individual locking pawls. However, if the locking pawls are mounted in a common guide, they are able to engage the teeth only at one location

SUMMARY OF THE INVENTION

It is therefore an object of the present invention to improve a tensioning apparatus of this type so that it avoids the above-described drawbacks and has a low structural height.

To accomplish this, the present invention employs a commercially available standard ratchet wheel as the lockable member. The locking means are at least two locking pawls. One of the two locking pawls may be arranged so as to be movable radially and translatorily relative to the ratchet wheel, as in the prior art. However, at least the second locking pawl is curved according to the invention. The concave side of the curved locking pawl is oriented toward the other locking pawl. When the curved locking pawl moves with respect to the ratchet wheel, it undergoes a movement which is composed of a rotational component as well as a linear or translatory component.

The curved locking pawl according to the present invention thus pivots when passing over a tooth. Due to the rotational component, the end of the curved locking pawl facing away from the ratchet wheel, the end that also provides a contact face for a spring element, moves in the direction toward the other locking pawl. In other words, while straight locking pawls that are distributed radially around the circumference would move translatorily in different directions, a curved pawl according to the present invention moves toward another pawl of the tensioning apparatus. While at least one of two prior art locking pawls that are not parallel must move translatorily more or less diagonally to the longitudinal direction of the tensioning apparatus, a curved locking pawl performs a pivoting movement essentially in the longitudinal direction of the apparatus. This allows the structural height of the apparatus to be advantageously reduced.

A tensioning apparatus with a low structural height has the advantage that it does not take up much transporting or storage space when goods are transported and stored. Moreover, it projects only very slightly from the lashing strap, so that the risk of hitting the lashing apparatus and incurring injuries is reduced. Additionally, a tensioning apparatus having a low structured height harmoniously integrates itself in the textile lashing strap.

The term lashing straps as employed in connection with the present invention refers to straps that may be textile lifting means, textile lashing straps, chains, steel cables, ropes, or the like. Consequently, the tensioning apparatus is suitable for any type of tensioning and lashing means.

The tensioning apparatus preferably has a basic frame and locking pawl guides that are configured to reduce the weight of the apparatus. Moreover, the locking pawls and the pawl guide slots preferably form V-shaped push guides which prevent the pawls from canting in the slots. Thus the pawls are guided in the slots in a permanent and firm manner. It is also of advantage from a manufacturing technology point of view that only a few components are required which interact in a form-locking manner. The simplicity of the structure additionally permits the use of unskilled labor for the assembly of the lashing apparatus.

At least one locking pawl is preferably curved in the shape of a ring segment. Such a locking pawl moves on a circular path when passing over a tooth. The curvature is not too severe, which would increase the danger of canting, but nevertheless it is sharp enough to ensure that the rotational component is sufficiently large to permit the tensioning apparatus to have a low structural height, which is particularly advantageous. Moreover, the ring segment shaped curvature of the locking pawl improves the transfer of forces. Due to the ring segment shaped configuration of the pawl guide slots, which is adapted to the locking pawl, the advantageous interaction of pawl and slot in the manner of a V-shaped push guide is enhanced.

The locking pawls may be arranged with respect to the teeth of the ratchet wheel so as to reduce the size of the ratchet steps. In particular, the arrangement can be one which permits ratchet step sizes that are independent of the tooth pitch of the teeth.

The ratchet wheel may also provide a drive member for the wind-up spindle. A driving pawl attached to a pivot lever and cooperating with the ratchet wheel form a drive assembly which is active between the pivot lever and the wind-up spindle. The configuration of the drive assembly is structurally simple. Moreover, the ratchet wheel also performs a second function as the drive wheel for the wind-up spindle.

A toothed directional ratchet mechanism may be employed in the tensioning apparatus.

Spring elements are preferably employed to bias the locking pawls. A common spring element may be used for both locking pawls to save material. Moreover, the use of one spring element for biasing two locking pawls also reduces the number of parts and simplifies the configuration of the tensioning apparatus. This simplifies manufacture and reduces costs. By employing a leg spring, the space required for the spring element can be reduced. This again enhances the reduction of the structural height of the overall tensioning apparatus.

The leg spring may be attached to a holding bar that projects from the basic body and extends into the space between the two locking pawls. Depending on the available installation space, the leg spring can be fixed in variable positions between the locking pawls. In this way, the space requirement can be reduced even more. The use of such a leg spring is favored in that ends of the locking pawls that contact the leg spring move toward one another when passing over a tooth. The co-action of such a leg spring with two curved locking pawls whose concave sides face one another is particularly advantageous. The movement of the locking pawls toward one another is here particularly intensive. Moreover, the space saving effect of only one curved locking pawl is in effect duplicated. The leg spring is preferably installed between the concave sides of the locking pawls to reduce the space required for the spring element and thus also reduce the structural height of the tensioning apparatus in an advantageous manner.

The driving pawl may also be curved, which contributes to a reduction of the structural height of the tensioning apparatus. Moreover, the same basic component can be employed for the driving pawl and one of the locking pawls. In addition to simplifying the manufacturing process, the use of this type of driving pawl mechanically facilitates the sliding of the driving pawl over the curved trailing edges of the teeth. During rotation counter to the tensioning direction, the area of the tensioning pawl that comes in contact with the trailing edges of the teeth lies flush against the trailing edges. This applies similarly for every curved locking pawl. If the driving pawl lies in a rest groove or in a release groove provided in the basic frame, these grooves must be shaped in such a manner that the driving pawl lies in them in a form locking manner.

DESCRIPTION OF THE PREFERRED EMBODIMENT

Figure 1:
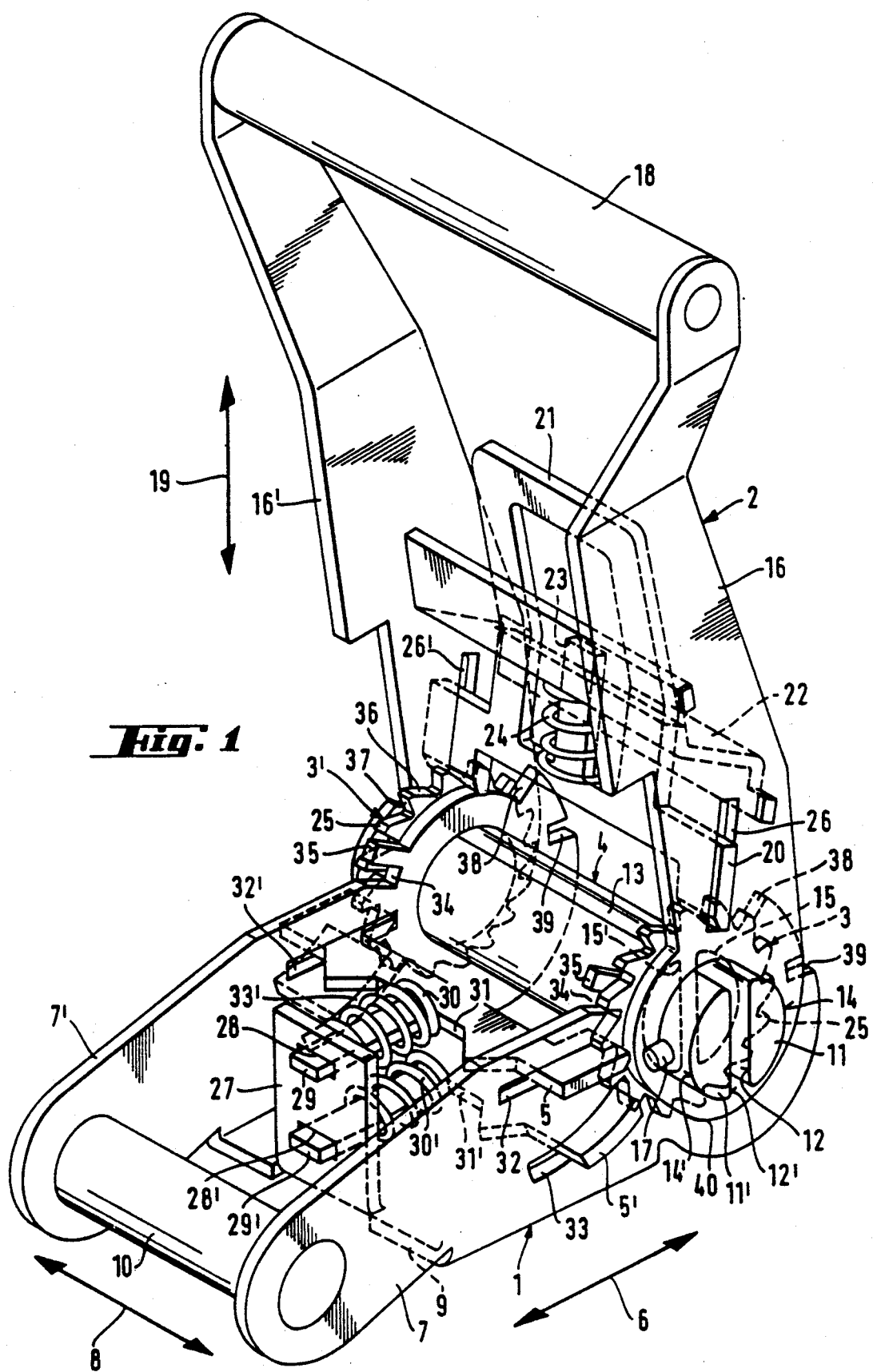
FIG. 1 is a perspective view of a tensioning apparatus according to a first embodiment of the invention.

A tensioning apparatus according to the invention is essentially composed of a basic frame 1, a pivot lever 2 acting as a tensioning lever, a wind-up spindle 4, and a ratchet mechanism. The ratchet mechanism, in turn, includes two ratchet wheels 3 and 3' serving as lockable members and two locking pawls 5 and 5' serving as locking means and preventing reverse rotation of wind-up spindle 4. The wind-up spindle 4 passes through ratchet wheels 3 and 3'.

Frame 1 has two frame side walls 7 and 7' that extend in the longitudinal direction 6. At its center, frame 1 has a U-shaped cross section when viewed in longitudinal direction 6.

The U-legs of the cross section are provided by frame side walls 7 and 7', and the bottom of the U is provided by a frame bottom 9 connected to the side walls. The free ends of frame side walls 7 and 7' project like a fork beyond the frame bottom 9 when the frame i is viewed in longitudinal direction 6. Frame 1 has a free fixing end, opposite the end that wind-up spindle 4 passes through, which is penetrated in transverse direction 8 by a transverse pin 10. The fixed end 51 of a lashing strap 50 (illustrated schematically in FIG. 2, and it will be apparent that a lashing strap would typically have a much longer length than shown when in actual use for securing cargo) is releasably fastened to this free fixing end.

Wind-up spindle 4 is composed of two half pins 11 and 11' that pass through the end of frame 1 opposite the free fixing end. These half pins each have a semicircular cross section. The planar sides 12 and 12' of half pins 11 and 11' are arranged at a small distance from one another to provide an insertion slot 13 extending in transverse direction 8 for the free end 52 of lashing strap 50 (see FIG. 2). The round sides 14 and 14' of the half pins face away from one another and form the wind-up surface for the lashing strap 50.

Half pins 11 and 11' additionally pass through ratchet wheels 3 and 3' and through the end of pivot lever 2 facing frame 1. Ratchet wheels 3 and 3' are provided with recesses 15 and 15', respectively, in their cores. In their spacing, arrangement, and dimensions, these recesses approximately correspond to the cross sections of half pins 11 and 11'. Half pins 11 and 11' penetrate the recesses 15 and 15' of ratchet wheels 3 and 3' in the manner of a loose fit. The inner sides of ratchet wheels 3 and 3' are flanked by the frame side walls 7 and 7' and the outer sides are flanked by pivot arms 16 and 16' of pivot lever 2. In order to prevent lateral slipping of the wind-up spindle 4, securing pins 17 (only one of which is shown) pass through the ends of the two half pins 14 and 14' outside of the pivot arms 16 and 16'.

At their ends facing away from wind-up spindle 4, the pivot arms 16 and 16' are connected in transverse direction 8 by way of a handle 18. Below handle 18, in gripping direction 19, an unlocking bar 21 extends from a driving pawl 20. By actuating unlocking bar 21, driving pawl 20 can be moved in gripping direction 19. Between pivot arms 16 and 16', a transverse connecting yoke 22 is provided which has a guide slot extending in transverse direction 8 to guide unlocking bar 21. A centering pin 23 is provided on the side of driving pawl 20 facing away from wind-up spindle 4. Centering pin 23 penetrates transverse connecting yoke 22 in gripping direction 19. In gripping direction 19, centering pin 23 is surrounded by a coil spring 24. Transverse connecting yoke 22 and the side of driving pawl 20 facing away from wind-up spindle 4 serve as abutments for the ends of spring 24. The biasing force of coil spring 24 moves driving pawl 20 toward the teeth 25 of ratchet wheels 3 and 3'. Unlocking bar 21 can be moved in gripping direction 19 in order to withdraw driving pawl 20 from the teeth. During this movement, driving pawl 20 is guided in straight tensioning guide slots 26 and 26' disposed in pivot arms 16 and 16'.

A guide member 27 is connected to frame bottom 9, in the center of it when seen in longitudinal direction 6. Guide member 27 has bearing openings 28 and 28' in order to accommodate guide pins 29 and 29', which extend from locking pawls 5 and 5' where they face away from the wind-up spindle 4. Guide pins 29 and 29' are surrounded by coil spring elements 30 and 30', which extend between guide member 27 and contact faces 31 and 31' of locking pawls 5 and 5'.

Locking pawls 5 and 5' are positioned with respect to one another in the manner of the legs of an acute angle whose apex is formed by the rotation axis of wind-up spindle 4, with locking pawl 5' having a curved configuration. If they were extended, the pawls would thus intersect at approximately the rotation axis of wind-up spindle 4. The biasing force of coil spring elements 30 and 30' moves locking pawls 5 and 5' toward the teeth 25 of ratchet wheels 3 and 3'. Locking pawls 5 and 5' are guided in pawl guide slots 32, 32' and 33, 33' in frame side walls 7 and 7'. The distance between locking pawls 5 and 5' is one and one-half times the tooth pitch t (see FIG. 2).

The cross-sectional configuration of the curved locking pawl 5' in the longitudinal direction has the shape of a ring segment, with the concave side of locking pawl 5' facing the planar locking pawl 5. The shape of pawl guide slots 33 and 33' is adapted to this ring segment shape of curved locking pawl 5'.

Figure 2:
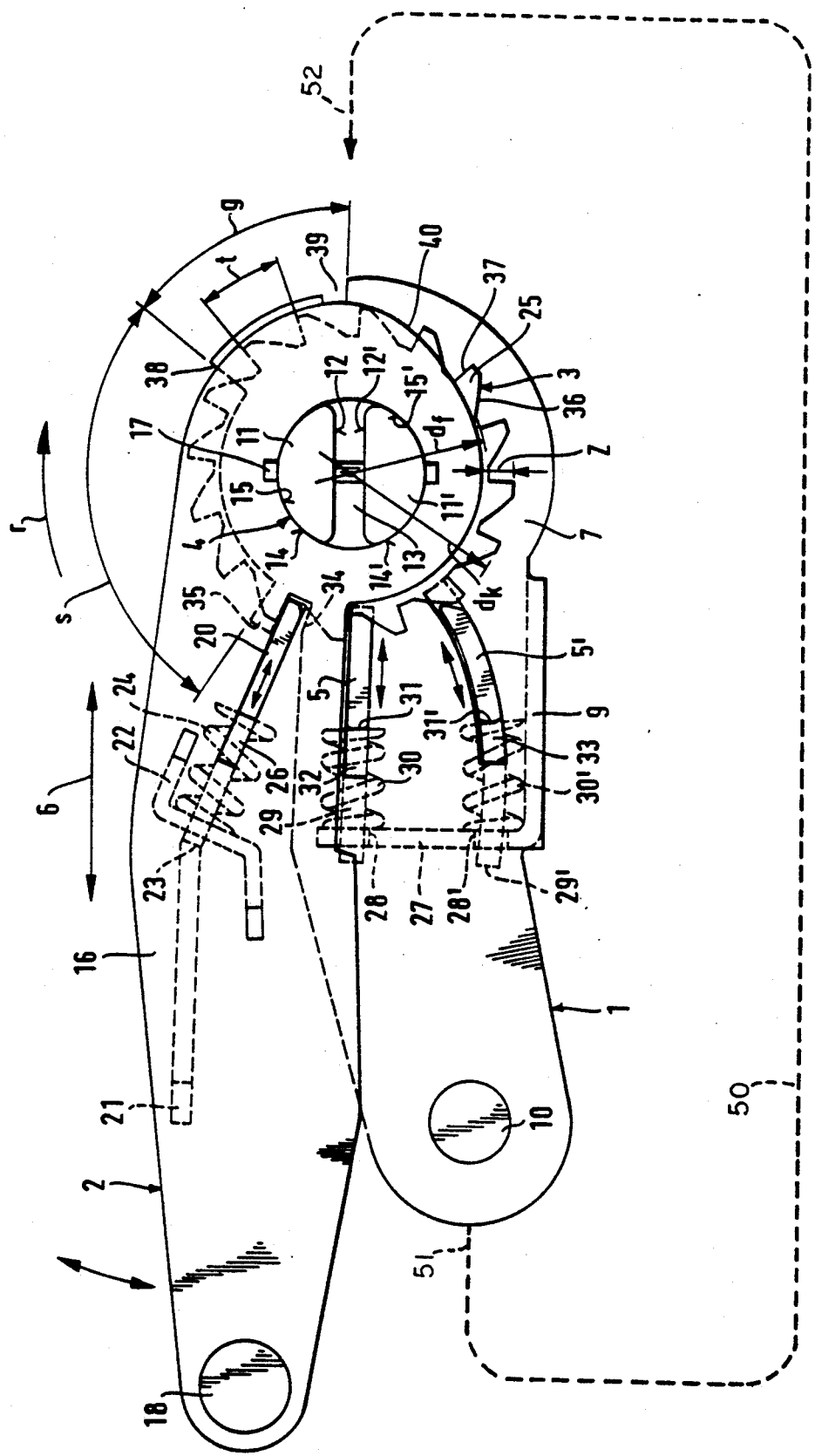
FIG. 2 is a side view of the tensioning apparatus of FIG. 1, and also schematically shows a tensioning strap used with the tensioning apparatus.

FIG. 2 is a side view of the tensioning apparatus extending in longitudinal direction 6. The apparatus is shown in its rest position. Frame 1 and pivot lever 2 are at an angle of 0° to one another. In the rest position, the front end of driving pawl 20, facing wind-up spindle 4, and its side faces following the front end, lie flush in a rest groove 34 (also see FIG. 1). The guide groove 34 is delimited on one side by a guide lug 35 and on the other side by frame side walls 7 and 7'.

In order to drive pivot lever 2 in tensioning direction r, the driving pawl 20 must be brought into a position within tensioning region s. Actuation of unlocking bar 21 in gripping direction 19 pulls driving pawl 20 out of the rest groove 34. To move pivot lever 2 in tensioning direction r into tensioning region s, driving pawl 20 must be raised beyond guide lug 35. Unlocking bar 21 is released after driving pawl 20 has been rotated to tensioning region s, with the tensioning region having an opening angle of pivot lever 2 (with respect to the 0° rest position shown in FIG. 2) of about 15° to about 110°. In tensioning region s, side walls 7 and 7' have a circular-segment-like shape when seen in transverse direction 8, with the diameter of the circle corresponding to the root circle diameter $d_f$ of the teeth on ratchet wheels 3 and 3'. If pivot lever 2 is rotated in tensioning direction r, the side of driving pawl 20 oriented in tensioning direction r engages behind the steep leading edge 37 of a tooth 25 and the other side of driving pawl 20 faces the rounded trailing edge 36 of the following tooth 25.

When driven in locking direction r, locking pawls 5 and 5', due to their spacing corresponding to one and one-half times the tooth pitch t, alternatingly engage the teeth of ratchet wheels 3 and 3'. The configuration of the detent region of locking pawls 5 and 5' is adapted to the shape of the surface of the teeth of ratchet wheels 3 and 3'. The detent region is composed of the pawl end faces facing ratchet wheel 3, 3' and the pawl side faces following thereafter. The locking pawls 5 and 5' are biased toward the ratchet wheels by coil spring elements 30 and 30' and engage the teeth in a form-locking manner. Upon engagement in the teeth, the rounded trailing edge 36 and the steep leading edge 37 of two adjacent teeth 25 touch the active faces of the detent region of the respective locking pawl 5 and 5'.

A ring segment like cross-sectional configuration is employed for locking pawl 5' since it results in a lower structural height for the overall tensioning apparatus. Moreover, force transfer is improved in tensioning direction r when the active face of the curved locking pawl 5' engages behind a tooth. Pawl guide slots 32, 32' and 33, 33' are disposed generally at an angle to one another and their shapes are adapted to the sides of locking pawls 5 and 5' as well as to the direction of movement of locking pawls 5 and 5'. The movement of curved locking pawl 5' has a rotational component that is produced by the ring segment shaped configuration of locking pawl 5' and the configuration of pawl guide slots 33 and 33' that are adapted thereto.

If pivot lever 2 is rotated counter to rotation direction r, one of locking pawls 5 or 5' engages behind a tooth of ratchet wheels 3 and 3' so that the lashing strap remains tensioned.

When pivot lever 2 is rotated clockwise to about the 110° position with respect to frame 1, driving pawl 20 encounters a tensioning stop 38. If the lashing strap is to be released, driving pawl 20 must be moved further through an unlashing region g and into a release groove 39. Unlashing region g has an opening angle range of about 110° to about 160°. In this region, frame side walls 7 and 7' are shaped as circular arcs, when seen in transverse direction 8, until reaching release groove 39. The diameter of these arcuate regions of side walls 7 and 7' is greater than the tip circle diameter $d_k$ of the teeth of ratchet wheels 3 and 3'. When unlocking bar 21 is pulled in gripping direction 19 and pivot lever 2 is subsequently rotated in direction r, the end of driving pawl 20 facing wind-up spindle 4 rests on the arcuate regions of frame side walls 7 and 7' facing it. Driving pawl 20 is thus moved out of engagement with the teeth of ratchet wheels 3 and 3' and can be slid counterclockwise (with respect to FIG. 2) to release groove 39.

In the released position, pivot lever 2 and frame 1 of the tensioning apparatus enclose an angle of about 180°. The end of driving pawl 20 facing wind-up spindle 4 locks into release groove 39. This released position can be changed only by pulling unlocking bar 21 in gripping direction 19, so that the risk of possible injuries and damage from the tensioning apparatus is greatly reduced. In this released position of the apparatus, cams 40 at the ends of pivot arms 16 and 16' move locking pawls 5 and 5' into a disengaged position with respect to the teeth of ratchet wheels 3 and 3', so that the ratchet mechanism is in its disengaged position and the free end of the lashing strap can be unwound and pulled out of wind-up spindle 4.

Figure 3:
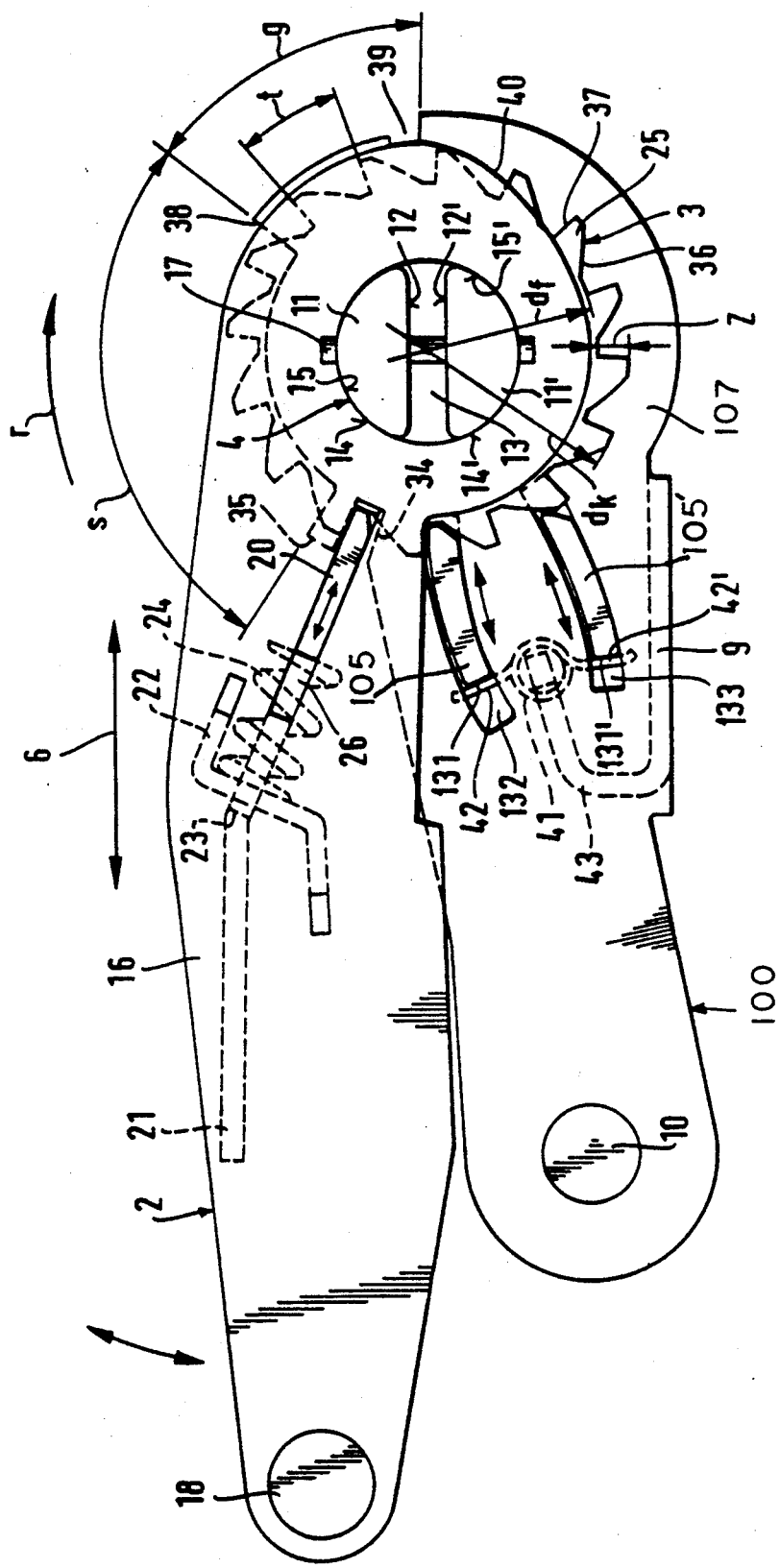
FIG. 3 is a side view of a second embodiment which includes two curved locking pawls biased by a single spring element.

FIG. 3 shows a modified embodiment of a tensioning apparatus according to the present invention. In this embodiment, both locking pawls 105 and 105' have a curved cross-sectional configuration which has the form of a ring segment in longitudinal direction 6. Correspondingly, both pairs of pawl guide slots 132, 132' and 133, 133' are adapted in their shape to the sides of the curved locking pawls 105 and 105' and to the direction of movement of the curved locking pawls 105 and 105'. (Guide slots 132 and 133 are provided in side wall 107 of basic frame 100, and although not shown it will be apparent that corresponding guide slots 132' and 133' are present in the side wall of basic frame 100 that is not illustrated in the drawings.) The use of two curved locking pawls 105 and 105' permits a further reduction of the structural height of the tensioning apparatus. Moreover, the advantage of a more effective force transfer in the direction of rotation as a result of the slightly rotational movement of locking pawls 105 and 105' is augmented further.

Another space saving and component saving feature is that the locking pawls 105 and 105' are supported at a single, common spring element. This spring element is a leg spring 41. The leg spring has two spring legs 42 and 42' which are arranged opposite one another. Legs 42 and 42' bias the contact faces 131 and 131' of locking pawls 105 and 105', respectively, with the spring pressure of leg spring 41 in the direction toward ratchet wheels 3 and 3'.

An angled holding bar 43, which has an initial portion that projects from the frame bottom perpendicularly to longitudinal direction 6 and transverse direction 8, fixes leg spring 41 in transverse direction 8. The holding bar 43 has free ends which project into the space between the concave sides of locking pawls 105 and 105'. Depending on the space available between locking pawls 105 and 105', leg spring 41 can be fixed at variable locations at the free end of holding bar 43. The use of a single spring element is facilitated by the fact that contact faces 131 and 131' of locking pawls 105 and 105' move toward one another due to their curved shape. The moving toward one another of the detent regions of locking pawls 105 and 105' due to their curved shape permits the use of a small tooth pitch angle. Additionally, the curved shape of locking pawls 105 and 105' produces a space saving rotational movement.

Figure 4:
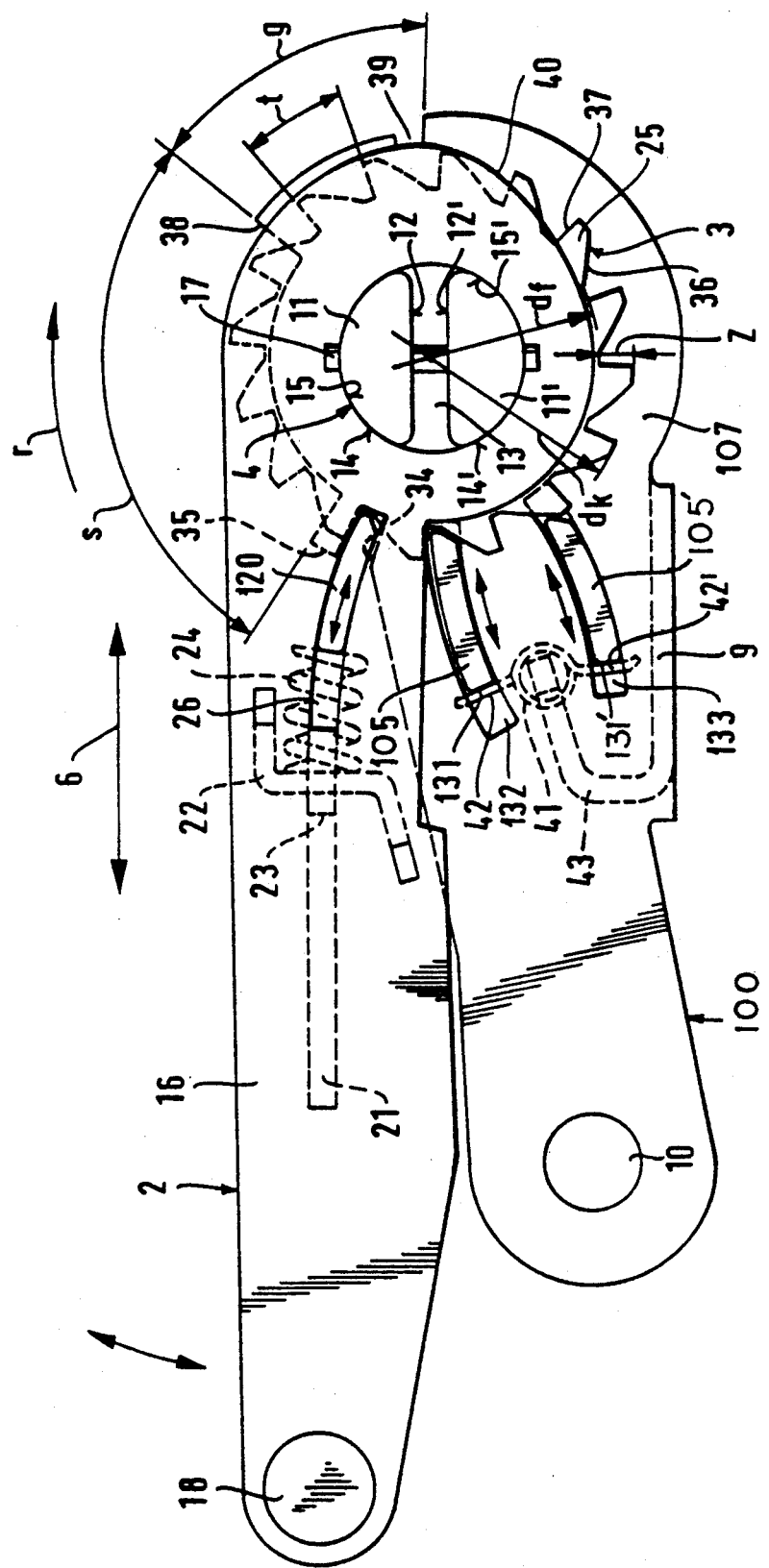
FIG. 4 is a side view showing a third embodiment with a curved driving pawl.

FIG. 4 shows a further improved embodiment of the lashing apparatus. This apparatus additionally includes a likewise curved driving pawl 120. This curved driving pawl 120 further reduces the structural height of the overall apparatus. A fact favorable from a manufacturing technology aspect, because fewer components are involved, is that the same pawls can be employed for locking pawls 105 and 105' as well as for driving pawl 120.

The effect of the curved pawls according to the invention on the structural height of a tensioning apparatus will be described in more detail with reference to the basic sketch shown in FIG. 5. A unit on the measuring axis 45 shown in FIG. 5 corresponds to the height Z of a tooth 25, measured at its steep leading edge 37. This tooth height Z is defined by the difference between the tip circle diameter $d_k$ and the root circle diameter $d_f$. A flat locking pawl, such as locking pawl 5 in the first embodiment, as well as a curved locking pawl, such as locking pawls 105 and 105' in the second and third embodiments, must be moved at least by the amount of this tooth height Z in order to release the ratchet teeth 25. This minimum required movement is marked $\Delta z$ in FIG. 5.

If the flat locking pawl 5 is moved by the distance $\Delta z$, the displacement movement includes only a motion component in the linear or translatory direction $B_t$. The movement of a curved locking pawl 105 or 105', however, includes a component in the rotational direction $B_r$ as well as a component in translatory direction $B_t$. Due to the radial arrangement of the locking pawls with respect to the ratchet wheels 3 and 3', a tensioning apparatus employing a plurality of locking pawls must have at least one locking pawl that extends diagonally—as shown in FIG. 5—to the longitudinal direction 6 of the tensioning device. The pawl guide slots for a flat locking pawl 5 or a curved locking pawl 105 or 105' must be at least as long as the length of the respective locking pawl plus $\Delta z$.

Since neither the rotational component $B_r$ nor the translatory component $B_t$ extends in longitudinal direction 6, the frame side walls, in order to accommodate the pawl guide slots, must have a minimum structural height $h_{min}$.

Figure 5:
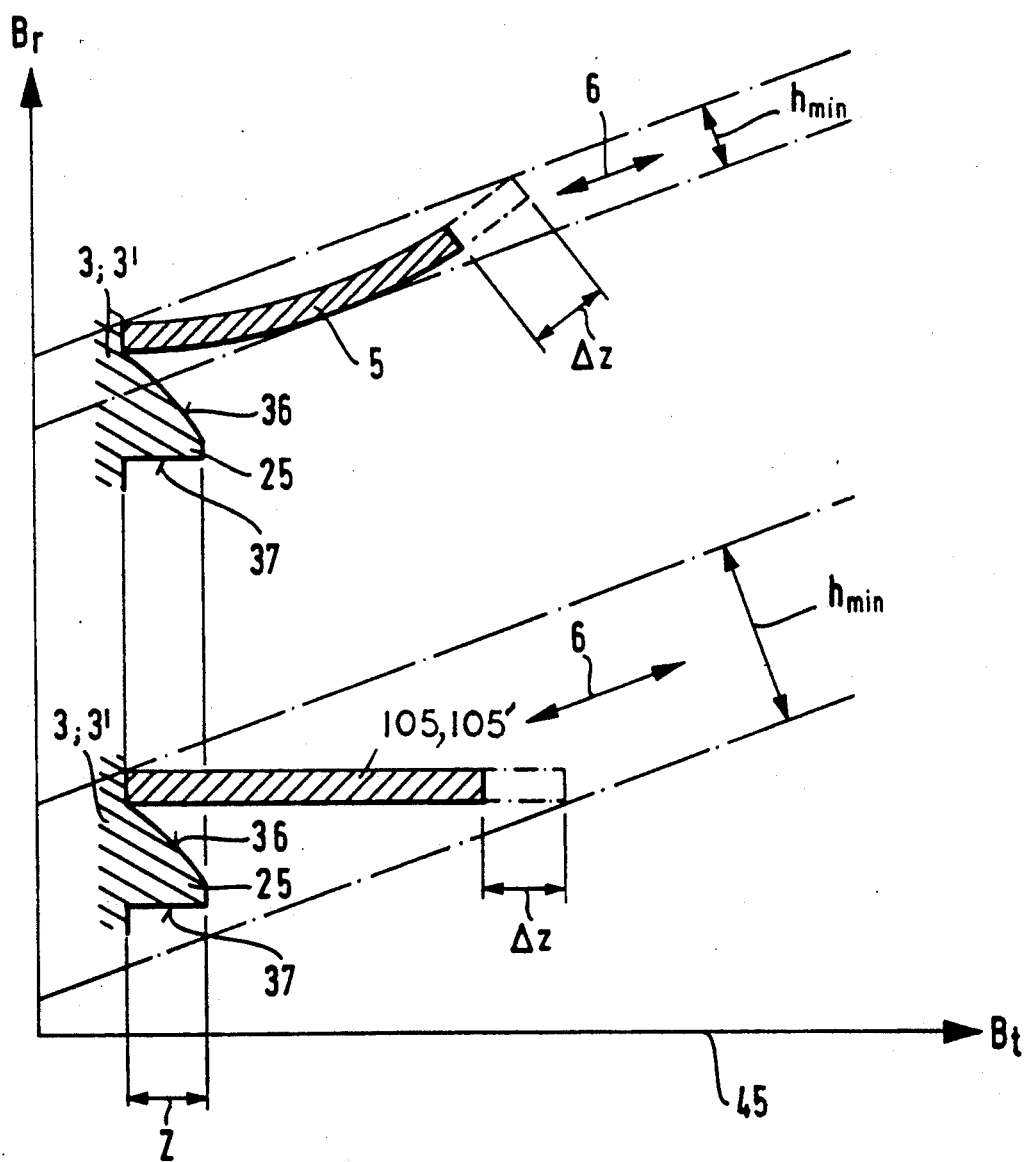
FIG. 5 is a basic schematic sketch comparing the kinematics of a curved locking pawl and the kinematics of a non-curved locking pawl.

Viewing FIG. 5 it becomes clear that the flat locking pawl 5 departs more and more from longitudinal direction 6 when it is moved outward along rounded edge 36 of a tooth, so that the minimum structural height $h_{min}$ continues to increase with increasing $\Delta z$. In contrast thereto, the rotational component $B_r$ for a curved locking pawl softens this tendency to increase the minimum structural height $h_{min}$. Due to the linear or translatory component $B_t$ which also exists and the rotational component $B_r$, the resulting direction of movement of a curved locking pawl 105 or 105' comes close to longitudinal direction 6. Thus, with a curved locking pawl, the minimum structural height $h_{min}$ is noticeably smaller than with a non-curved locking pawl. Thus, the rotational component $B_r$ diverts the resulting direction of movement of a curved locking pawl 105 or 105' into longitudinal direction 6.

The minimum structural height $h_{min}$ in a tensioning apparatus employing curved locking pawls is consequently displaced from the critical structural height (extending perpendicular to longitudinal direction 6 and transverse direction 8) to the uncritical structural length (extending in longitudinal direction 6). The lower the minimum structural height $h_{min}$, the more likely the overall height of the apparatus (in the direction perpendicular to directions 6 and 8) can be reduced. The structural height can be reduced because the locking pawls are not constrained to be moveable only in the translatory motion direction $B_t$. Instead, they are curved in such a way that they can be pivoted out of and into the longitudinal direction 6, with the resulting movement having a translatory motion component $B_t$ and a rotational motion component $B_r$.

It will be understood that the above description of the present invention is susceptible to various modifications, changes, and adaptations, and the same are intended to be comprehended within the meaning and range of equivalents of the appended claims.

What is claimed is:

1. A tensioning apparatus for a lashing strap having a fixed end and a free end, comprising:
    a frame having two side walls which extend parallel to one another, the fixed end of the lashing strap being operationally connected to the frame;
    a wind-up spindle that is rotatably mounted on the frame and that receives the free end of the lashing strap; and
    ratchet mechanism means for securing the wind-up spindle from rotation in a first direction with respect to the frame, the ratchet mechanism means including
        a ratchet wheel connected to the wind-up spindle,
        first and second locking pawls that are mounted on the frame and moveable between an engaged position wherein the locking pawls contact the ratchet wheel and a disengaged position wherein the locking pawls are withdrawn from the ratchet wheel, the first locking pawl having a curved configuration so as to reduce the structural height required for the frame, and
        biasing means for biasing the locking pawls toward the engaged position,
    wherein the first locking pawl is shaped as a ring segment,
    wherein each side wall of the frame has a respective first pawl guide slot through which the first locking pawl extends, the first pawl guide slots conforming to the curved configuration of the first locking pawl and being shaped as ring segments, and
    wherein each side wall of the frame additionally has a second pawl guide slot through which the second locking pawl extends.

2. The tensioning apparatus of claim 1, wherein the side walls of the frame extend in a longitudinal direction, and wherein a cross section of the frame taken in a transverse direction that is perpendicular to the transverse direction is generally U-shaped, with the side walls providing the legs of the U.

3. The tensioning apparatus of claim 2, wherein the pawl guide slots extend generally in the longitudinal direction and have inner ends that are oriented toward the ratchet wheel and outer ends that are oriented away from the ratchet wheel, the inner ends of the pawl guide slots in a side wall being closer than the outer ends of the pawl guide slots in the same side wall, and wherein the tensioning apparatus further comprises means for securing the locking pawls from displacement in the transverse direction.

4. The tensioning apparatus of claim 1, wherein the first locking pawl has a concave side and a convex side, wherein the second locking pawl also has a curved configuration, with a concave side and a convex side, wherein the second pawl guide slot is curved, and wherein the first and second pawl guide slots are disposed in such a manner that the concave sides of the locking pawls face one another.

5. The tensioning apparatus of claim 4, wherein the second locking pawl is also shaped as a ring segment, wherein the second pawl guide slots are also shaped as ring segments, wherein the locking pawls have forward ends that are directed toward the ratchet wheel, wherein the pawl guide slots guide the locking pawls for sliding moving toward or away from the ratchet wheel, and wherein the front ends of the locking pawls move toward each other as the locking pawls slide toward the ratchet wheel.

6. The tensioning apparatus of claim 4, wherein the biasing means comprises a leg spring having a coiled portion and first and second legs that extend from the coiled portion, the first leg of the leg spring contacting the first locking pawl, the second leg of the leg spring contacting the second locking pawl, and the coiled portion of the leg spring being mounted between the concave sides of the locking pawls.

7. The tensioning apparatus of claim 1, wherein the ratchet wheel has a plurality of teeth, each having a leading edge and a trailing edge, and wherein the locking pawls are positioned so that, when they are in their engaged position, one locking pawl touches the leading edge of a tooth and the other locking pawl touches the trailing edge of another tooth.

8. The tensioning apparatus of claim 7, wherein the locking pawls have forward ends that are directed toward the ratchet wheel, wherein the ratchet wheel has a predetermined tooth pitch, and wherein the forward ends of the locking pawls are separated by a distance corresponding to one and a half times the tooth pitch when the locking pawls are in their engaged position.

9. The tensioning apparatus of claim 1, wherein the biasing means comprises a first spring which urges the first locking pawl toward the ratchet wheel and a second spring which urges the second locking pawl toward the ratchet wheel.

10. The tensioning apparatus of claim 1, wherein the biasing means comprises a common spring element which urges both locking pawls toward the ratchet wheel.

11. The tensioning apparatus of claim 10, wherein the locking pawls have forward ends that are directed toward the ratchet wheel and rear ends that are directed away from the ratchet wheel, and wherein the common spring element comprises a leg spring having first and second oppositely disposed legs, the first leg lying against the rear end of the first locking pawl and the second leg lying against the rear end of the second locking pawl.

12. The tensioning apparatus of claim 10, wherein the frame further comprises a holding bar which projects toward the ratchet wheel, the common spring element being mounted on the holding bar.

13. The tensioning apparatus of claim 1, further comprising:
a pivot lever having a bearing end, the wind-up spindle extending through the bearing end to mount the pivot lever for pivoting movement with respect to the frame, the pivot lever being pivotal in the first direction and in a second direction that is opposite the first direction; and
driving means, carried by the pivot lever and cooperating with the ratchet wheel, for rotating the wind-up spindle in the second direction when the pivot lever is manually pivoted in the second direction.

14. The tensioning apparatus of claim 13, wherein the driving means comprises a driving pawl that is movably mounted on the pivot lever.

15. The tensioning apparatus of claim 14, wherein the ratchet wheel has teeth, the biasing means urging the locking pawls toward the teeth of the ratchet wheel, and wherein the driving means further comprises means for biasing the driving pawl toward the teeth of the ratchet wheel.

16. The tensioning apparatus of claim 14, wherein the driving pawl is curved and has a concave side, the concave side of the driving pawl facing the frame.

17. The tensioning apparatus of claim 1, wherein the first pawl guide slots have a constant width, wherein the second pawl guide slots have a constant width, and wherein the width of the first pawl guide slots is the same as the width of the second pawl guide slots.

* * * * *